2 Sheets—Sheet 1.
A. RICKART.
HORSE-RAKE.
No. 174,006.  Patented Feb. 22, 1876.
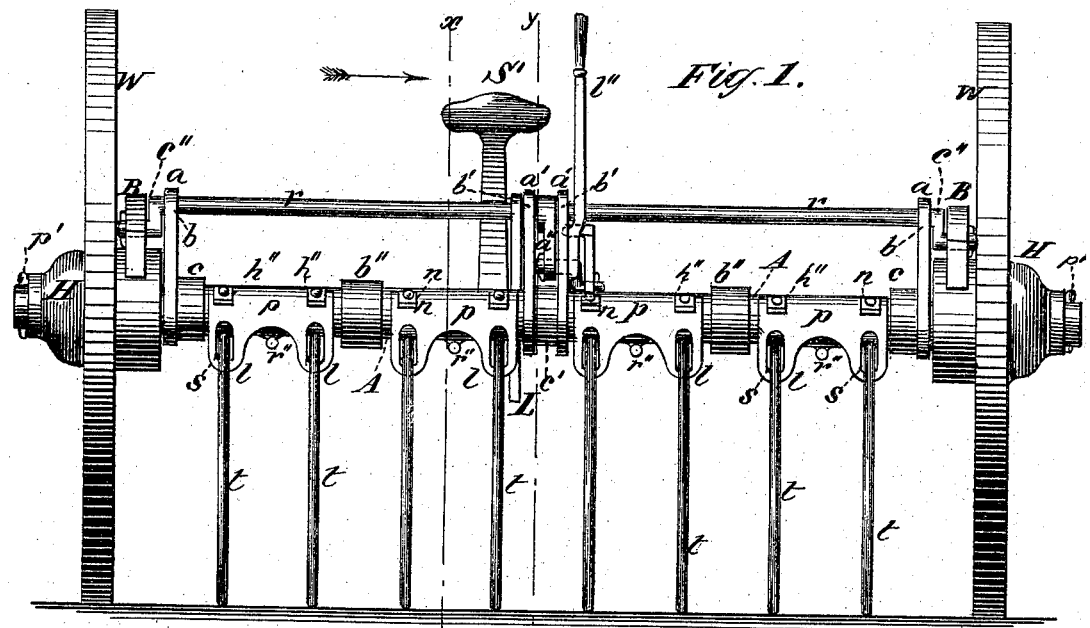
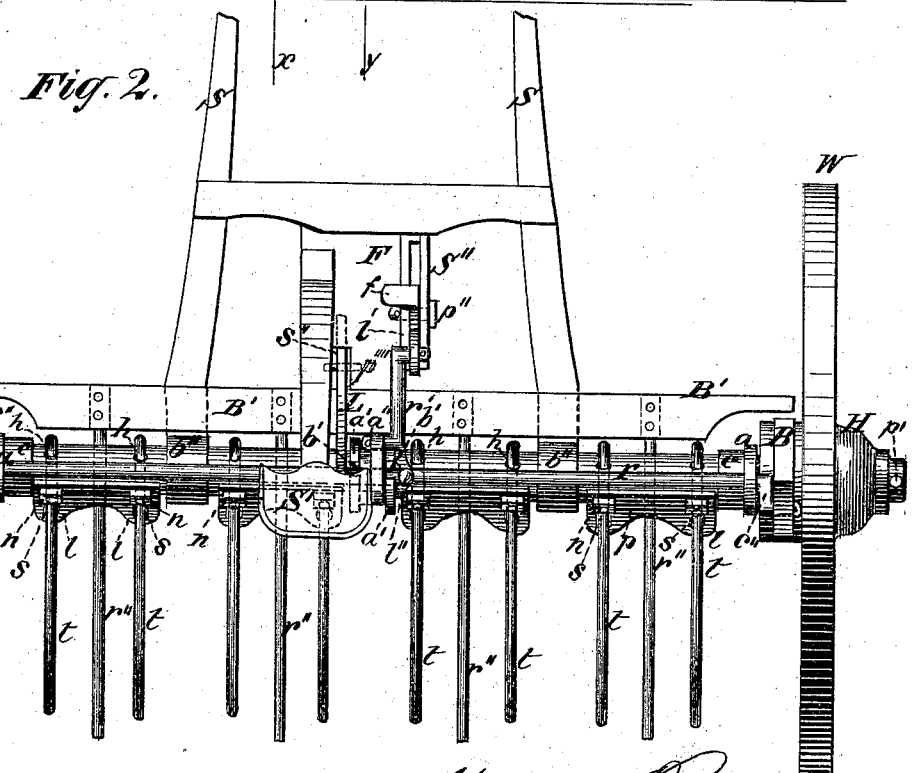
Witnesses
John Becker
Fred Haynes
Alexander Rickart
by his Attorneys
Brown & Allen 2 Sheets—Sheet 2.

A. RICKART.
HORSE-RAKE.

No. 174,006. Patented Feb. 22, 1876.

Witnesses
John Decker.
Fred. Haynes

Alexander Rickart
by his Attorneys
Brown & Allen

UNITED STATES PATENT OFFICE.

ALEXANDER RICKART, OF SCHOHARIE, NEW YORK.

IMPROVEMENT IN HORSE-RAKES.

Specification forming part of Letters Patent No. 174,006, dated February 22, 1876; application filed December 8, 1875.

*To all whom it may concern:*

Be it known that I, ALEXANDER RICKART, of Schoharie Court-House, Schoharie county, State of New York, have invented Improvements in Hay-Rakes; and I do hereby declare that the following is a full, clear, and exact description of the same.

My invention relates more particularly to that class of hay-rakes drawn by animals, which dump their load automatically when the dumping mechanism is set in train; but it is in part applicable to other rakes. It consists in combinations of devices which not only effect the dumping of the load gathered by the rake, but also cause the weight of the rider or driver, who sits upon the seat of the rake, to assist the animal that draws the rake at the moment of raising the rake-teeth. It consists, further, in a peculiar method of attaching the rake-teeth to the axle-tree of the wheels which support and carry the other parts.

Figure 3:
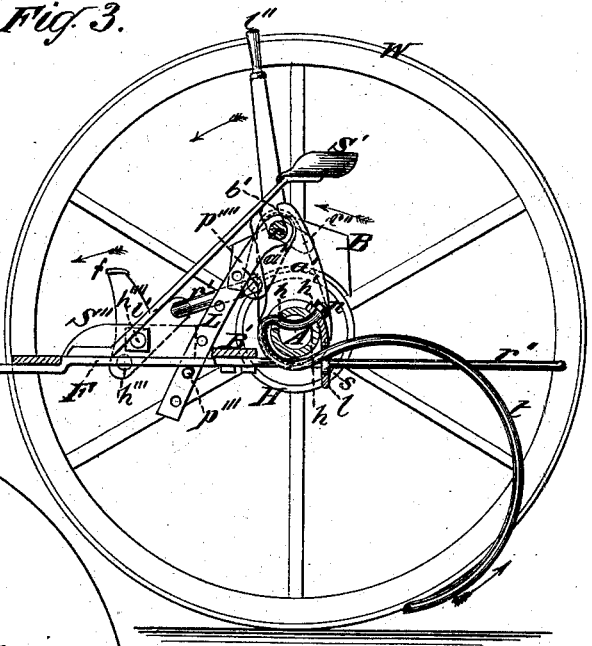
Figure 5:
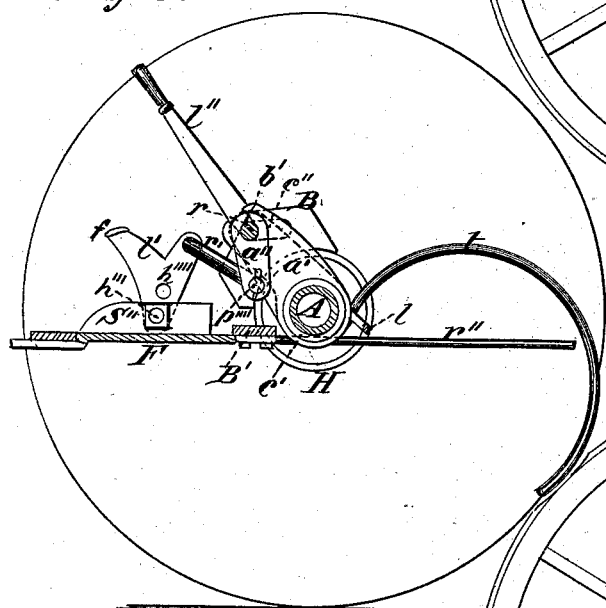
Figure 4:
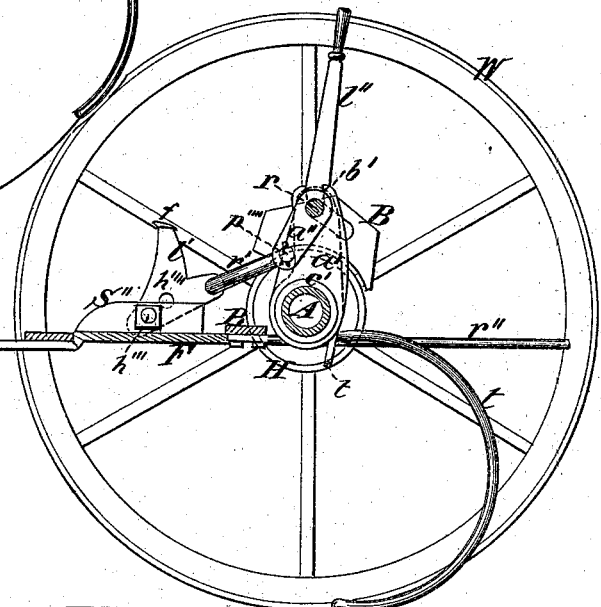

Figure 1 is a rear view of a rake constructed to carry out my invention. Fig. 2 is a top view of the same. Fig. 3 is a section made at right angle with the axle-tree, on the line $x\ x$ in Figs. 1 and 2. Fig. 4 is a section made at a right angle with the axle-tree, and on the line $y\ y$, Figs. 1 and 2. Fig. 5 is a sectional detail, the section being made on the same line as that shown in Fig. 4.

Similar letters refer to like parts in all the engravings.

The axle-tree A is made of metal tubing of suitable length and diameter. In this tube are drilled radially pairs of holes $h\ h'$, the holes in each pair being preferably somewhat less than one hundred and eighty degrees asunder, these holes being for the reception of the rake-teeth $t$. The rake-teeth $t$ are made of round metal bars or wire of suitable diameter, and bent into the general form shown in all the figures, but more minutely in Fig. 3. Their upper ends are screw-threaded to receive nuts $n$. On the rear part of the axle-tree are placed brace-plates $p$, preferably, but not necessarily, made detachable from the axle-tree. On the lower parts of these plates are formed lugs $l$, and in the lugs $l$ are formed slots $s$, through which the recurved parts of the rake-teeth $t$, respectively, pass when the teeth $t$ are inserted, as hereinafter described. The plates $p$ have holes $h''$ drilled in their upper opposite corners to receive the upper ends of the rake-teeth $t$. The sides of the slots $s$ in the lugs of the brace-plates brace the teeth laterally, while they permit of a certain amount of vertical movement on the part of the teeth $t$ when passing over small obstructions.

The teeth $t$ having been placed in the holes $h\ h'$, as shown in Fig. 3, the slots $s$ in the lugs $l$ of the brace-plates $p$ are slipped over the lower points of the teeth $t$, and brought up to their places against the axle-tree, when the upper ends of the rake-teeth, respectively, are inserted in the holes $h''\ h''$, and the nuts $n$ being then screwed upon the upper ends of the teeth $t$, both the brace-plates $p$ and the teeth will be firmly attached to the axle-tree. The brace-plates are preferably made with two slotted lugs, $l$, and two holes, $h''$, at the top, that each may embrace two teeth, $t$; but I do not limit myself to this number.

To the axle-tree A are rigidly attached, by welding or any other suitable means, the collars $c\ c'$ and the arms $a\ a'$. The collars $c$ are placed flush against the inner flat sides of the arms $a$, and the outer flat sides of the arms $a$ abut against the inner ends of the hubs H of the wheels W, which abutment, acting in antagonism to the linchpins $p'$, serves to hold the wheel in proper position upon the axle-tree. The wheels W may be of ordinary or any other approved construction. The arms $a$ are made with suitable bearings $b$ at the top to aid in the support of a rock-shaft, $r$, which has at each extremity a crank, $c''$. To each crank-wrist is pivoted a brake-shoe, B, which, when actuated through the rock-shaft, is pressed firmly down upon the top of the inner end of the hub of the wheel next to it. The arms $a'$ are separated on the axle-tree by the collar $c'$, and they have formed at their tops notched bearings $b'$, or other suitable bearings, which support and steady the middle of the rock-shaft $r$. Between the two arms $a'$ is rigidly attached to the rock-shaft a lever-arm, $a''$, pivoted to and connected by a rod, $r'$, with the elbow-lever $l'$ and a pivot, $p''''$. The shafts S encircle the axle-tree at their rear ends, so as to form bands $b''$ for their attachment; or the shafts may be attached to the axle-tree in any way that will not interfere with the free rotary movement of the shaft with the hubs H of the wheels W, when the brake-shoes B are pressed against the hubs. Near the attachment of the shafts S to the axle-tree A is bolted to the shafts S the bar B', to which are attached, in the ordinary manner, the clearing-rods $r''$. To a suitable frame-work, F, connecting the shafts S, is affixed the standard of the driver's seat S' and a support, S'', for the elbow-lever $l'$, which is pivoted to the support S'' by the pivot $p''$. The elbow-lever has its rear extremity pivoted to the connecting-rod $r'$, and its upper and forward arm has at the top a foot-piece, $f$, to receive the pressure of the operator's foot, as hereinafter described. The elbow-lever $l'$ has two holes, $h'''$ and $h''''$, for the reception, respectively, of the pivot $p''$, each of which adjustments permits the mechanism to perform a different function, as hereinafter described. L is a link, having its upper end loosely attached to the rock-shaft $r$ and its lower end hanging loosely through a slot, $s''$, in the frame-work F. The body of the link L is perforated at intervals to receive a pin, $p'''$, by which arrangement the teeth of the rake may be set so that their points shall stand at any desired distance from the ground in raking over grain, stubble, &c., as will hereinafter be described. There is also rigidly attached to the rock-shaft, at one side of the pair of arms $a$, a hand-lever, $l''$, by which the rocking of the shaft can be effected, as herein described.

The operation of the rake is as follows, assuming the rake to be drawn by an animal between the shafts, driven by a driver seated on the seat S':

When the teeth $t$ have gathered a sufficient quantity of hay or grain to deposit it in a windrow the driver presses his foot on the foot-piece of the elbow-lever $l'$. This, through the connecting-rod $r'$, draws forward the lower end of the lever arm $a''$, and rocks the rock-shaft backward, depressing the wrists of the cranks $c''$, and pressing down upon the extreme surface of the inner ends of the hubs H the brake-shoes B. The brake-shoes thus become movable fulcra, which, through the medium of the cranks $c''$ and the arms $a$, raise and support briefly all the weight of the axle-tree A, and the parts supported by the axle-tree, except the comparatively small weight supported by the animal through the medium of the shafts S. As the animal now draws the machine forward, the brake-shoes B move forward by a rotary motion, with the exterior of the hubs, throwing the center of the support forward of the center of rotation, thus utilizing the weight of the parts in front of the axle-tree, together with the weight of the driver, to counterpoise, more or less, the weight of the parts behind the axle-tree, as well as the load of hay or grain accumulated. In the absence of this counterpoising action the power necessary to elevate the teeth and discharge the load would necessarily be derived wholly from the animal during the time of elevation and discharge. Moreover, this counterpoising action enables the teeth of the rake to be lightly dropped to their first position with very slight exertion on the part of the driver. With rakes whose dumping devices are actuated with ratchet and pawl, backing is prevented. This inconvenience is obviated by the use of the brake-shoes. The hand-lever $l''$ may be used to raise the teeth and discharge their load independently of the automatic train of devices when required.

By placing the pivot $p''$ in the hole $h''''$ of the elbow-lever $l'$ the pivot $p''''$, which connects the connecting-rod $r'$ with the elbow-lever $l'$, falls by its own gravity lower than the line joining the pivot $p''''$ in the lever-arm $a''$ and the pivot $p''$ in the elbow-lever support. The tendency of the teeth to rise and deliver their load is, therefore, resisted in this position; neither can the teeth be raised by the use of the hand-lever $l''$. This adjustment, which, in no wise, interferes with the dumping of the load when the dumping mechanism is set in action by the pressure of the foot upon the foot-piece $f$ of the elbow-lever $l''$, is of great use and convenience in raking over smooth ground.

By placing the pivot $p''$ in the hole $h'''$, the pivot $p''''$ is brought above the line of centers joining the pivot $p''''$ in the lever-arm $a''$ and the pivot $p''$ in the elbow-lever support S''. The mechanism does not then resist the rising of the teeth, but leaves them free to rise and pass over any obstruction they may meet in raking over rough ground.

I claim—

1. The combination of the hollow axle A, provided with the holes $h$ $h'$, the teeth $t$, constructed and inserted through the said holes, as described, the slotted brace-plates $p$, and the nuts $n$, substantially as herein set forth.

2. The brake-shoes B, in combination with the rock-shaft $r$, having the cranks $c''$, as described, the wheels W, the arms $a$ and $a'$, and the axle-tree A, whereby the weight of all the parts, except the wheels, is principally thrown upon the exterior surface of the hubs H, substantially as herein set forth.

3. The lever $l'$, the connecting-rod $r'$, and lever-arm $a''$, in combination with the rock-shaft $r$, the brake-shoes B, the arms $a$ and $a'$, the axle-tree A, and the wheels W, substantially as herein set forth.

4. The perforated link, in combination with the rock-shaft $r$, the arms $a$ and $a'$, the axle-tree A, and frame F, and pin $p''''$, substantially as and for the purpose herein described.

ALEXANDER RICKART.

Witnesses:
JOHN G. GEBHARD,
CHAS. BREWSTER.